(12) United States Patent
Ma et al.

(10) Patent No.: US 10,712,496 B2
(45) Date of Patent: Jul. 14, 2020

(54) POSITIONING STRUCTURE, BACKLIGHT SOURCE, DISPLAY MODULE AND DISPLAY DEVICE

(71) Applicant: BOE TECHNOLOGY GROUP CO., LTD., Beijing (CN)

(72) Inventors: Yongda Ma, Beijing (CN); Yong Qiao, Beijing (CN); Jianbo Xian, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/478,082

(22) PCT Filed: Sep. 25, 2018

(86) PCT No.: PCT/CN2018/107215
§ 371 (c)(1),
(2) Date: Jul. 15, 2019

(87) PCT Pub. No.: WO2019/062683
PCT Pub. Date: Apr. 4, 2019

(65) Prior Publication Data
US 2019/0369324 A1    Dec. 5, 2019

(30) Foreign Application Priority Data
Sep. 30, 2017 (CN) .......................... 2017 2 1278800

(51) Int. Cl.
*G02F 1/1333* (2006.01)
*F21V 8/00* (2006.01)

(52) U.S. Cl.
CPC .......... *G02B 6/0088* (2013.01); *G02B 6/0085* (2013.01); *G02F 2001/133314* (2013.01);
(Continued)

(58) Field of Classification Search
CPC ........................... G02B 6/0081; G02B 6/0088
See application file for complete search history.

(56) References Cited

U.S. PATENT DOCUMENTS

2007/0139967 A1    6/2007 Peng
2011/0069509 A1*   3/2011 Lin ...................... G02B 6/0088
                                        362/607
(Continued)

FOREIGN PATENT DOCUMENTS

CN    102053401 A    5/2011
CN    102650394 A    8/2012
(Continued)

OTHER PUBLICATIONS

International Search Report of PCT/2018/107215, dated Dec. 24, 2018, 14 pages.

*Primary Examiner* — Zheng Song
(74) *Attorney, Agent, or Firm* — Muncy, Geissler, Olds & Lowe, P.C.

(57) ABSTRACT

The present disclosure provide a positioning structure, a backlight source, a display module, and a display device, and the positioning structure is applied to a backlight source include a light guide plate and an optical film, the positioning structure includes a structural body, the structural body includes: multiple protruding structures spaced from each other, an end portion of each of the protruding structures adjacent to the light guide plate forming a contact positioning surface, and at least two contact positioning surfaces located in a same plane forming a first positioning surface for positioning an end surface of the light guide plate; wherein the structural body is provided with a second positioning surface for positioning an end surface of the optical film of the backlight source, and the second positioning surface and the first positioning surface are located at different planes.

14 Claims, 6 Drawing Sheets

(52) U.S. Cl.
CPC ............ *G02F 2001/133317* (2013.01); *G02F 2001/133322* (2013.01)

(56) References Cited

U.S. PATENT DOCUMENTS

| | | | |
|---|---|---|---|
| 2011/0102701 A1 | 5/2011 | Teng et al. | |
| 2013/0135901 A1* | 5/2013 | Ishimoto | G02B 6/24 362/617 |
| 2013/0286294 A1* | 10/2013 | Hosoki | G02B 6/0091 348/739 |
| 2013/0308074 A1* | 11/2013 | Park | G02B 6/0088 349/58 |
| 2013/0322118 A1* | 12/2013 | Kuo | G02F 1/133308 362/611 |
| 2013/0343087 A1 | 12/2013 | Huang | |
| 2014/0022483 A1* | 1/2014 | Kuo | H05K 7/18 349/58 |
| 2015/0260908 A1 | 9/2015 | Kiguchi | |
| 2015/0338573 A1* | 11/2015 | Kao | G02B 6/0088 362/611 |
| 2016/0091658 A1* | 3/2016 | Wu | G02B 6/0088 362/615 |
| 2018/0292603 A1 | 10/2018 | Yu et al. | |
| 2018/0341144 A1* | 11/2018 | Song | G02F 1/133308 |

FOREIGN PATENT DOCUMENTS

| | | |
|---|---|---|
| CN | 202484901 U | 10/2012 |
| CN | 104456310 A | 3/2015 |
| CN | 104685555 A | 6/2015 |
| CN | 105423240 A | 3/2016 |
| CN | 205721003 U | 11/2016 |
| CN | 207181905 U | 4/2018 |
| WO | WO-2013143180 A1 | 10/2013 |
| WO | WO-2013189102 A1 | 12/2013 |

\* cited by examiner

POSITIONING STRUCTURE, BACKLIGHT SOURCE, DISPLAY MODULE AND DISPLAY DEVICE

CROSS-REFERENCE TO RELATED APPLICATION

This application is the U.S. national phase of PCT Application No. PCT/CN2018/107215 filed on Sep. 25, 2018, which claims priority to Chinese Patent Application No. 201721278800.5 filed on Sep. 30, 2017, the disclosures of which are incorporated in their entirety by reference herein.

TECHNICAL FIELD

The present disclosure relates to the field of display technologies, and in particular, to a positioning structure, a backlight source, a display module, and a display device.

BACKGROUND

A liquid crystal display (LCD) includes a liquid crystal display panel and a backlight source, and the backlight source provides a light source for the liquid crystal display panel such that the LCD can display an image.

In general, main components of the backlight source include a back plate, a border, a plastic frame, an optical film, a light guide plate, and a light-emitting diode (LED) light bar, etc., and may further include positioning structures for positioning the light guide plate and the optical film, respectively.

SUMMARY

Embodiments of the present disclosure provide a positioning structure, a backlight source, a display module, and a display device.

In a first respect, an embodiment of the present disclosure provides a positioning structure, applied to a backlight source including a light guide plate and an optical film, the positioning structure includes a structural body, wherein the structural body includes:

a plurality of protruding structures spaced from each other, an end portion of each of the protruding structures adjacent to the light guide plate forming a contact positioning surface, and at least two contact positioning surfaces located in a same plane forming a first positioning surface for positioning an end surface of the light guide plate;

wherein the structural body is provided with a second positioning surface for positioning an end surface of the optical film of the backlight source, and the second positioning surface and the first positioning surface are located at different planes.

Optionally, the structural body further includes a bottom surface, the contact positioning surfaces of multiple protruding structures are formed as a surface which is arranged on the bottom surface and closest to the light guide plate on multiple protruding structures protruding from the bottom surface.

Optionally, a distance between the contact positioning surface and the bottom surface is less than or equal to a thermal expansion amount of the light guide plate when the backlight source is in operation and greater than a preset value, wherein the preset value is a difference value between a thermal expansion amount of the light guide plate and a thermal expansion amount of the optical film when the backlight source is in operation.

Optionally, each of multiple protruding structures extends from a first surface of the structural body to a second surface of the structural body facing the first surface, wherein the first surface and the second surface respectively extend to form two end surface of each of multiple protruding structures.

Optionally, a groove with a quadrangular cross section is formed between two adjacent protruding structures, and an inner bottom surface of the groove is formed as a bottom surface of the structural body.

Optionally, multiple protruding structure extend in a direction parallel with or perpendicular to a first direction, wherein the first direction is a longitudinal direction of an end surface of the light guide plate positioned by the first positioning surface.

Optionally, the bottom surface is parallel to each of the contact positioning surfaces.

Optionally, multiple protruding structures are formed as cylinders arranged on the bottom surface, and the cylinders extend in a direction perpendicular to the bottom surface.

Optionally, multiple protruding structures formed as cylinders are arranged in rows on the bottom surface.

Optionally, in a second direction, an interval width between two adjacent protruding structures is less than twice a width of a larger contact positioning surface of two adjacent contact positioning surfaces, and is greater than half of the width of the larger contact positioning surface, the second direction is a direction determined on the plane of the first positioning surface along which two adjacent contact positioning surfaces has a minimum di stance therebetween.

Optionally, the second body is vertically disposed on a third surface of the first body, the contact positioning surface is arranged on the first body, the second positioning surface is arranged on the second body, and the contact positioning surface is perpendicular to the third surface and the second positioning surface.

Optionally, the number of the second positioning surfaces is at least two, the second positioning surfaces are respectively located in different planes, and the at least two second positioning surfaces are each perpendicular to the first positioning surface.

Optionally, at least two second positioning surfaces is formed in a stepped shape.

Optionally, the structural body includes a fourth surface perpendicular to the first positioning surface, and the fourth surface is provided with grooves of different sizes, the grooves form at least two step-shaped surfaces, each of the at least two step-shaped surfaces is formed as one of the second positioning surfaces.

In a second respect, an embodiment of the present disclosure provides a backlight source, including a light guide plate and an optical film, wherein the backlight further includes the positioning structure described above, wherein an end surface of the light guide plate is connected oppositely to the first positioning surface, and an end surface of the optical film is connected to the second positioning surface.

In a third respect, an embodiment of the present disclosure provides a display module, including the backlight source described above.

In a fourth respect, an embodiment of the present disclosure provides including the display module described above.

DETAILED DESCRIPTION

Figure 1:
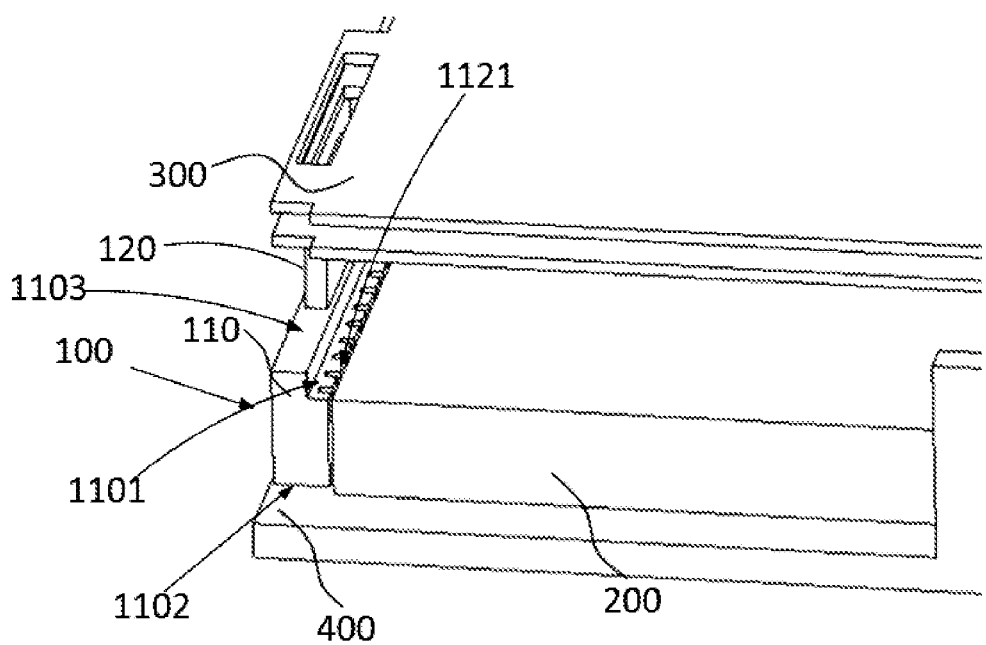
FIG. 1 is a schematic perspective view of a backlight source using a positioning structure according to some embodiments of the present disclosure.

Technical solutions of embodiments of the present disclosure will be described hereinafter in a clear and complete manner in conjunction with drawings of the embodiments of the present disclosure. Obviously, the following embodiments are merely a part of, rather than all of, the embodiments of the present disclosure, and based on these embodiments, a person skilled in the art may obtain the other embodiments, which also fall within the scope of the present disclosure.

Since both a light guide plate and an optical film of the backlight source are thermally expanded during using the backlight source, a size of a positioning structure is designed based on thermal expansion of the light guide plate and the optical film, for meeting the positioning redundancy requirement.

In related arts, since a thermal expansion coefficient of the light guide plate is different from a thermal expansion coefficient of the optical film, different positioning structures may be used to position the light guide plate and the optical film in order to meet different positioning redundancy requirements, thereby causing a complex structure of a backlight source.

Some embodiments of the present disclosure provide a positioning structure, which is applied to a backlight source. The positioning structure can position both a light guide plate and an optical film.

The positioning structure of some embodiments of the present disclosure includes a structural body, and the structural body includes:

multiple protruding structures spaced from each other, an end portion of each of the protruding structures adjacent to the light guide plate forming a contact positioning surface, and at least two contact positioning surfaces located in a same plane forming a first positioning surface for positioning an end surface of the light guide plate;

wherein the structural body is provided with a second positioning surface for positioning an end surface of the optical film of the backlight source, and the second positioning surface and the first positioning surface are located at different planes.

The positioning structure of some embodiments of the present disclosure includes a first positioning surface for positioning the light guide plate and a second positioning surface for positioning the optical film, the first positioning surface includes multiple contact positioning surfaces spaced from each other, and intervals are formed between the each two adjacent contact positioning surfaces used for positioning the light guide plate, thereby increasing the extendable range of the light guide plate when the backlight source is in operation, and supplementing a difference in positioning redundancy between the light guide plate and the optical film due to different thermal expansion coefficients of the light guide plate and the optical film, thereby reducing a complexity of a structure of the entire backlight source.

Specifically, the structural body of the positioning structure further includes a bottom surface, and contact positioning surfaces of the plurality of protruding structures are formed as a surface arranged on the bottom surface and closest to the light guide plate on the plurality of protruding structures protruding from the bottom surface.

Optionally, a distance between the contact positioning surface and the bottom surface is less than or equal to a thermal expansion amount of the light guide plate when the backlight source is in operation and greater than a preset value, wherein the preset value is a difference value between a thermal expansion amount of the light guide plate and a thermal expansion amount of the optical film when the backlight source is in operation.

Figure 2:
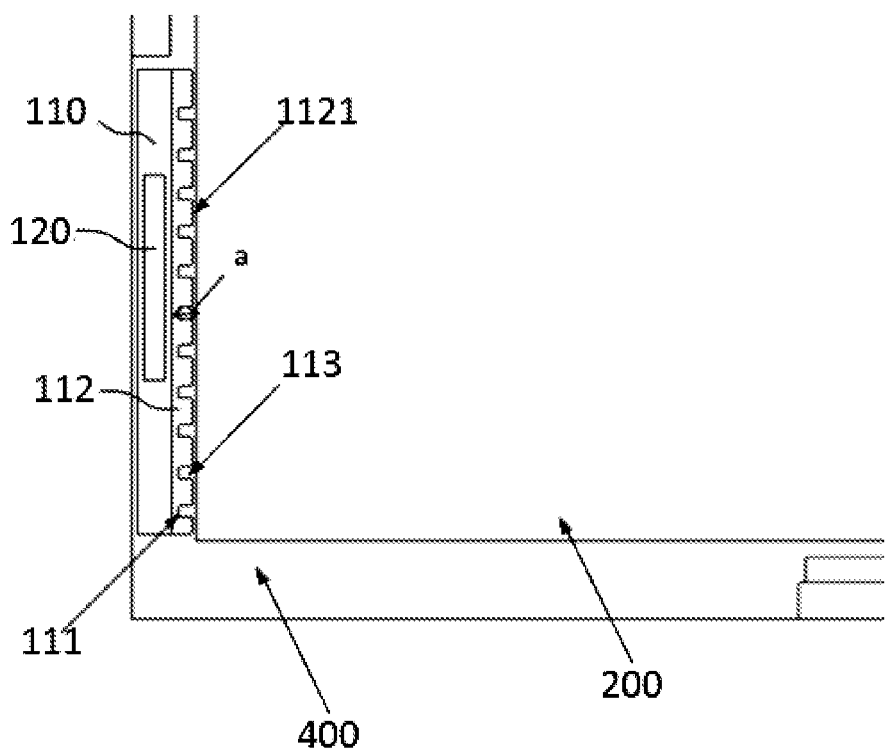
FIG. 2 is a schematic top view showing a positional relationship between a positioning structure and a light guide plate according to some embodiments of the present disclosure.

FIG. 1 is a schematic perspective view of a backlight source using a positioning structure according to some embodiments of the present disclosure, and FIG. 2 is a schematic top view showing a positional relationship between the positioning structure and a light guide plate according to some embodiments of the disclosure. Referring to FIG. 1 and FIG. 2, in some embodiments, a structural body of a positioning structure 100 includes a first body 110 and a second body 120, wherein a first positioning surface for positioning an end surface of the light guide plate 200 is formed on the first body, and a second positioning surface for positioning one end surface of the optical film 300 is formed on the second body 120.

In some embodiments of the present disclosure, the first body 110 includes a bottom surface 111. Multiple protruding structures 112 are provided on the bottom surface 111. Surfaces of the multiple protruding structures 112 away from the bottom surface 111 are in a same plane, wherein a surface of each protruding structure 112 away from the bottom surface 111 forms one contact positioning surface 1121, and all of the contact positioning surfaces 1121 of the protruding structures 112 away from the bottom surface 111 are formed as a first positioning surface for positioning an end surface of the light guide plate 200.

Referring to FIG. 1 and FIG. 2, for the backlight source, the first body 110 of the positioning structure 100 is vertically arranged on the back plate 400, and a surface of the light guide plate 200 is opposite to and in close contact with the first positioning surface formed by combining multiple contact positioning surfaces 1121.

In some embodiment of the present disclosure, each protruding structure 112 extends from a first surface 1101 of the first body 110 to a second surface 1102 of the first body 110 opposite to the first surface 1101, the first surface 1101 and the second surface 1102 respectively extend to form two end surface of each protruding structure 112, that is, the contact positioning surfaces. In the embodiment, the second surface 1102 is formed as a surface that is in close contact with the back plate 400, and the first surface 1101 is arranged in parallel with the second surface 1102. Based on the arrangement, referring to FIGS. 1 and 2, in some embodiments, each protruding structure 112 extends perpendicular to the first surface 1101 and the second surface 1102, and also extends perpendicular to a surface of the back plate 400 for mounting the positioning structure 100, and further extends perpendicular to a longitudinal direction (a first direction) of an end surface of the light guide plate 200 positioned by the first positioning surface.

Further referring to FIGS. 1 and 2, based on the above arrangement, in some embodiments, a groove 113 with a quadrangular cross section is formed between each two adjacent protruding structures 112, and an inner bottom surface of each groove 113 is formed as the bottom surface 111 of the structural body.

In some embodiments of the present disclosure, in a surface on which the contact positioning surfaces 1121 are located, a direction along which two adjacent contact positioning surfaces 1121 has a minimum distance therebetween is determined as a second direction. In the second direction, an interval width between each two adjacent contact positioning surfaces 1121 is less than twice a width of the larger contact positioning surface 1121 of the two adjacent contact positioning surfaces 1121, and is greater than half of the width of the larger contact positioning surface 1121. In the specific embodiment of the present disclosure, as shown in FIGS. 1 and 2, the second direction is perpendicular to a direction along with the contact positioning surfaces 1121 extend in a plane in which the contact positioning surfaces 1121 are located, that is, is perpendicular to a direction along which each protruding structure 112 extends.

Furthermore, as shown in FIG. 2, a distance a between a contact positioning surface 1121 of each protruding structure 112 and the bottom surface 111 (that is, a height of each protruding structure 112 protruding from the bottom surface 111) is less than or equal to a thermal expansion amount of the light guide plate 200 when the backlight source is in operation and greater than a preset value which is a difference value between a thermal expansion amount of the light guide plate 200 and a thermal expansion amount of the optical film 300 when the backlight source is in operation.

Since a thermal expansion coefficient of the optical film differs from a thermal expansion coefficient of the light guide plate, the first positioning surface for positioning the light guide plate includes multiple contact positioning surfaces, and a groove having a depth a is formed between each two adjacent contact positioning surfaces, thereby increasing an extendable range of the light guide plate when the backlight source is in operation. In order to ensure that a positioning redundancy design of the light guide plate can be matched with a positioning redundancy design of the optical film, the depth a is less than or equal to a thermal expansion amount of the light guide plate 200 when the backlight source is in operation, and is greater than a preset different value between a thermal expansion amount of the light guide plate 200 and a thermal expansion amount of the optical film 300 when the backlight source is in operation.

In general, a ratio of a thermal expansion coefficient of the optical film to a thermal expansion coefficient of the light guide plate is 16:17, Therefore, when a thermal expansion amount of the light guide plate is $\Delta L$, a thermal expansion amount of the optical film is 16 $\Delta L/17$, and a different value between the thermal expansion amount of the light guide plate 200 and the thermal expansion amount of the optical film is $\Delta L/17$.

Referring to FIGS. 1 and 2, in some embodiments of the present disclosure, a second positioning surface for positioning an end surface of the optical film 300 is formed on the second body 120, and the second body 120 is vertically disposed on a third surface 1103 of the first body 110. An end surface of the second body 120 opposite to an end surface of the second body 120 to which the third surface 1103 is fitted is used for connecting cooperatively to a positioning hole on the optical film 300, for supporting the optical film 300.

Therefore, the surface of the second body 120 which is connected cooperatively to the positioning hole of the optical film 300 is formed as a second positioning surface.

Figure 3:
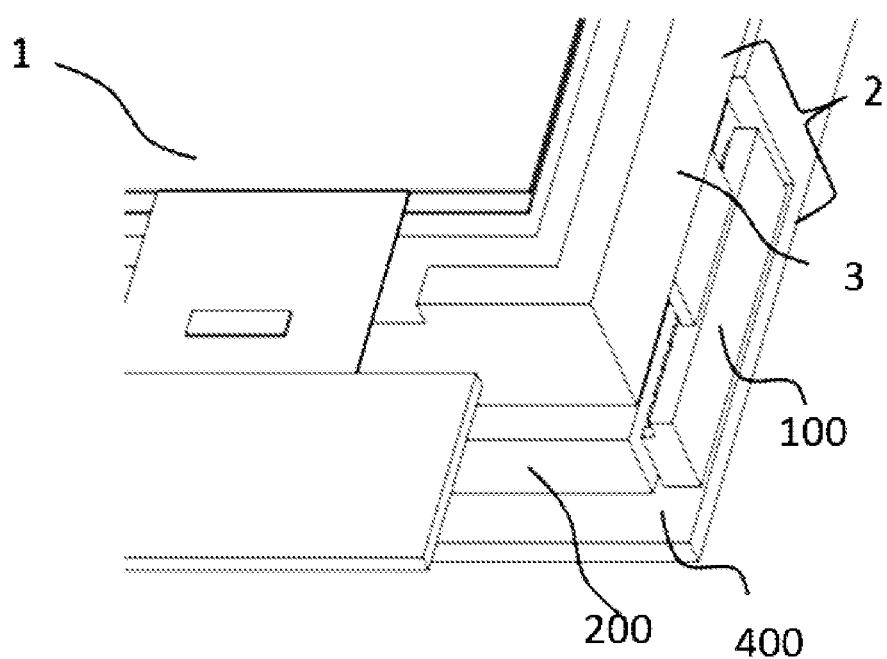
FIG. 3 is a schematic perspective view of a display module including a positioning structure according to some embodiments of the present disclosure.

With the positioning structure of some embodiments, as shown in FIGS. 1 to 3, the positioning structure 100 is disposed on the back plate 400, and the first positioning surface including multiple contact positioning surfaces 1121 is perpendicular to the back plate 400, and the second body 120 is vertically disposed on the third surface 1103 of the first body 110, and the surface of the second body 120 away from the third surface 1103 is formed as the second positioning surface. The light guide plate 200 is disposed on the back plate 400, and an end surface of the light guide plate 200 is in close contact with the first positioning surface, and the optical film 300 is arranged parallel to the light guide plate 200 and connected cooperatively to a second positioning surface on the second body 120 via the arranged positioning hole.

Figure 4:
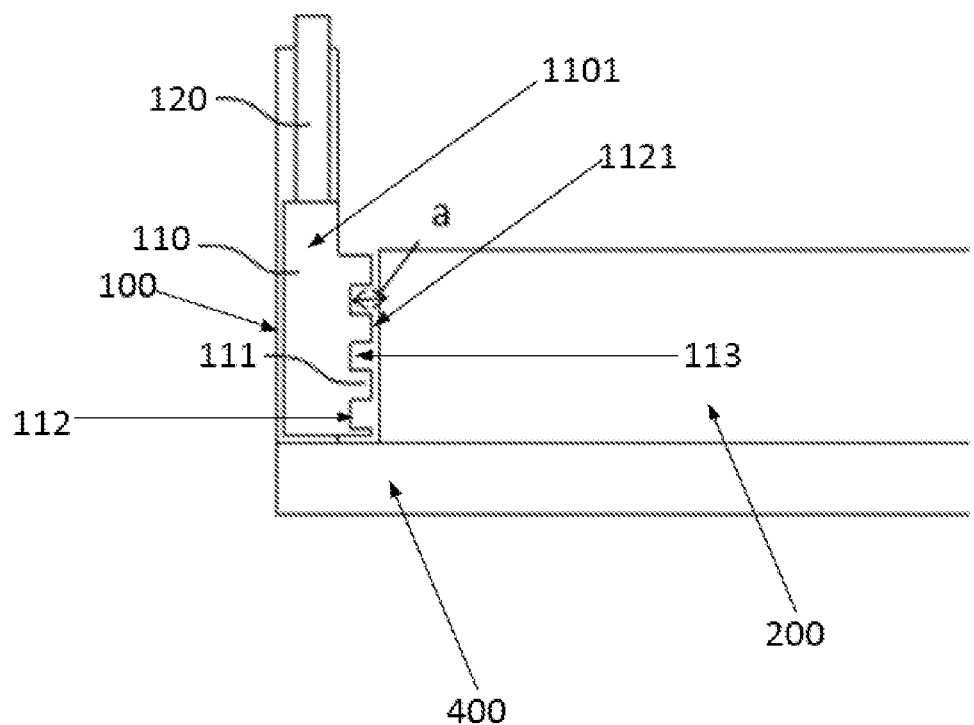
FIG. 4 is a schematic structural view showing a positional relationship between a positioning structure and a light guide plate according to some embodiments of the present disclosure.

Furthermore, embodiments of the present disclosure further provides a positioning structure, as shown in FIG. 4, in which a schematic planar structure view of a positional relationship between the positioning structure and a light guide plate is shown, a structural body of a positioning structure 100 includes a first body 110 and a second body 120, in which a first positioning surface for positioning an end surface of the light guide plate 200 is formed on the first body 110, and a second positioning surface for positioning an end surface of the optical film is formed on the second body 120.

In some embodiments, a structure of the second body 120 is the same as that of the second body 120 described above, which is not repeated herein.

Furthermore, a structure of the first body 110 here is the same as that of the first body 110 described above. The first body 110 includes a bottom surface 111. Multiple protruding structures 112 are provided on the bottom surface 111. Surfaces of the multiple protruding structures 112 away from the bottom surface 111 are located in a same plane, wherein a surface of each protruding structure 112 away from the bottom surface 111 forms one contact positioning surface 1121, and the whole of contact positioning surfaces 1121 are formed as a first positioning surface for positioning an end surface of the light guide plate 200.

Different from the first body 110 structure described above, each protruding structure 112 extends from the first surface 1101 of the first body 110 to a second surface (not shown) opposite to the first surface 1101. In the embodiment, the first surface 1101 and the second surface are each perpendicular to a back plate 400 on which the positioning structure 100 is arranged, and the first surface 1101 and the second surface 1102 respectively extend to form two end surface of each protruding structure 112, that is, the contact positioning surfaces. Based on the arrangement, in some embodiments, each protruding structure 112 extends perpendicular to the first surface 1101 and the second surface 1102, and is parallel to the back plate 400 for mounting the positioning structure 100, and further parallel to a longitudinal direction (a first direction) of an end surface of the light guide plate 200 positioned by the first positioning surface.

Further referring to FIG. 4, based on the above arrangement, in some embodiments, a groove 113 with a quadrangular cross section is formed between each two adjacent protruding structures 112, and an inner bottom surface of the groove 113 is formed as the bottom surface 111 of the structural body.

Optionally, as in some embodiments described above, as shown in FIG. 4, a distance a between a contact positioning surface 1121 of each protruding structure 112 and the bottom surface 111 (that is, a height of each protruding structure 112 protruding from the bottom surface 111) is less than or equal to a thermal expansion amount of the light guide plate 200 when the backlight source is in operation and greater than a preset value which is a difference value between a thermal expansion amount of the light guide plate 200 and a thermal expansion amount of the optical film 300 when the backlight source is in operation. A manner for determining the difference value can be obtained by referring to the above description, which will be not repeated herein.

Figure 5:
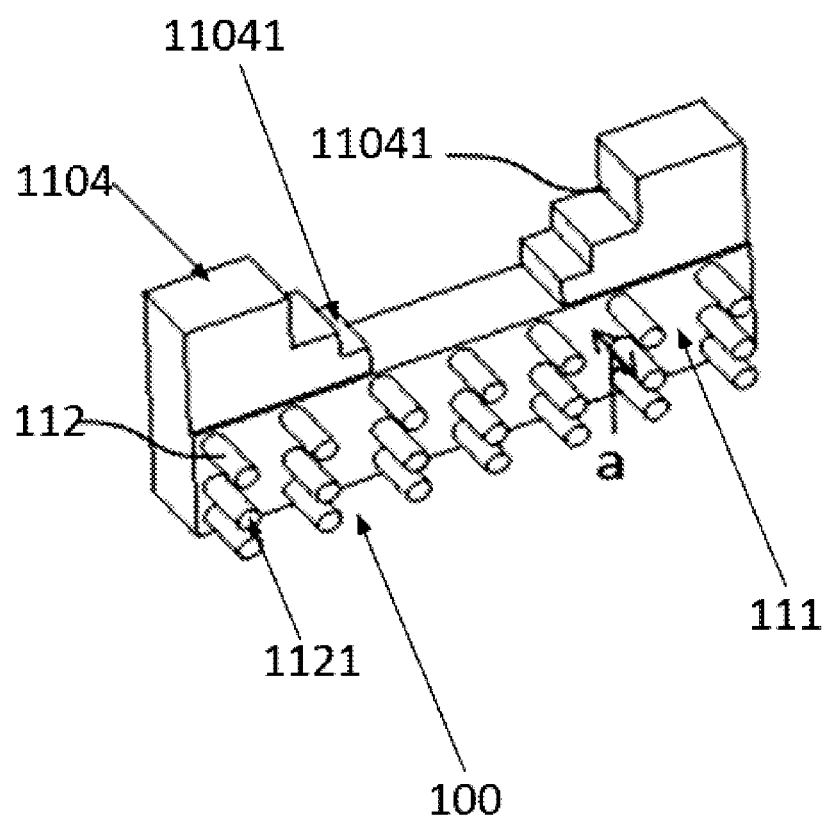
FIG. 5 is a schematic perspective view of a positioning structure according to some embodiments of the present disclosure.

Some embodiments of the present disclosure further provides a positioning structure 100, as shown in FIG. 5, a structural body of the positioning structure 100 is formed as an integrated structure. The structural body includes a bottom surface 111. The bottom surface 111 is provided with multiple protruding structures 112, each of which has a shape of a cylinder. The multiple protruding structures 112 extend perpendicular to the bottom surface 111. Surfaces of the multiple protruding structures 112 away from the bottom surface 111 are located in a same plane, wherein a surface of each protruding structure 112 away from the bottom surface 111 forms one contact positioning surface 1121, and the whole of contact positioning surfaces 1121 are formed as a first positioning surface for positioning an end surface of the light guide plate.

In the embodiment, the bottom surface 111 is parallel to the contact positioning surface 1121 and parallel to an end surface of the light guide plate required to be positioned, each protruding structure 112 is perpendicular to the end surface of the light guide plate required to be positioned, and optionally, the multiple protruding structures 112 are arranged in rows on the bottom surface.

Furthermore, in the embodiment, in a surface on which the contact positioning surfaces 1121 are located, a direction along which two adjacent contact positioning surfaces 1121 has a minimum distance therebetween is determined to be a direction between center points of circular contact positioning surfaces 1121, as the second direction. In the second direction, a interval width between each two adjacent protruding structures 112 is less than twice a width of a larger contact positioning surface of each two adjacent contact positioning surfaces, and is greater than half of the width of the larger contact positioning surface 1121, thereby ensuring a support strength of the positioning structure 100 to the light guide plate.

Furthermore, as shown in FIG. 5, a distance a between a contact positioning surface 1121 of each protruding structure 112 and the bottom surface 111 (that is, a height of each protruding structure 112 protruding from the bottom surface 111) is less than or equal to a thermal expansion amount of the light guide plate when the backlight source is in operation and greater than a preset value which is a difference value between a thermal expansion amount of the light guide plate and a thermal expansion amount of the optical film when the backlight source is in operation. A manner for determining the difference value can be obtained by referring to the above description for determining the difference value described above, which will be not repeated herein.

Furthermore, in conjunction with FIG. 5, in some embodiments of the present disclosure, the positioning structure 100 includes a fourth surface 1104 perpendicular to a plane in which the contact positioning surface 1121 is located. The fourth surface 1104 is provided with grooves of different sizes to form at least two step-shaped surfaces 11041, in which each step-shaped surface 11041 is formed as one second positioning surface for positioning installation of the optical film, and each second positioning surface can be used to place one optical film.

Therefore, in some embodiments, the number of the second positioning surface may be at least two, respectively located in different planes.

According to the positioning structure of some embodiments of the present disclosure, when the positioning structure is mounted on the backlight source, the positioning structure 100 is disposed on the back plate, and a surface of the positioning structure 100 opposite to the fourth surface 1104 is connected cooperatively to the back plate such that the first positioning surface including multiple contact positioning surfaces 1121 is perpendicular to the back plate 400. The light guide plate 200 is disposed on the back plate 400, and an end surface of the light guide plate 200 is in close contact with the first positioning surface; the optical film 300 is arranged parallel to the light guide plate 200, and the optical film 300 is placed on one of the step-shaped surface 11041, therefore the light guide plate 200 and the optical film 300 are positioned and installed.

It can be understood that the positioning structures for positioning an end surface of the light guide plate and an end surface of the optical film of the embodiments shown in FIGS. 1 to 5 are only shown in partial structural diagrams. Based on the above description, those skilled in the art should be able to acknowledge a specific structure of an entire positioning structure for positioning an end surface of the light guide plate and an end surface of the optical film, which will not be described in detail herein.

Figure 6:
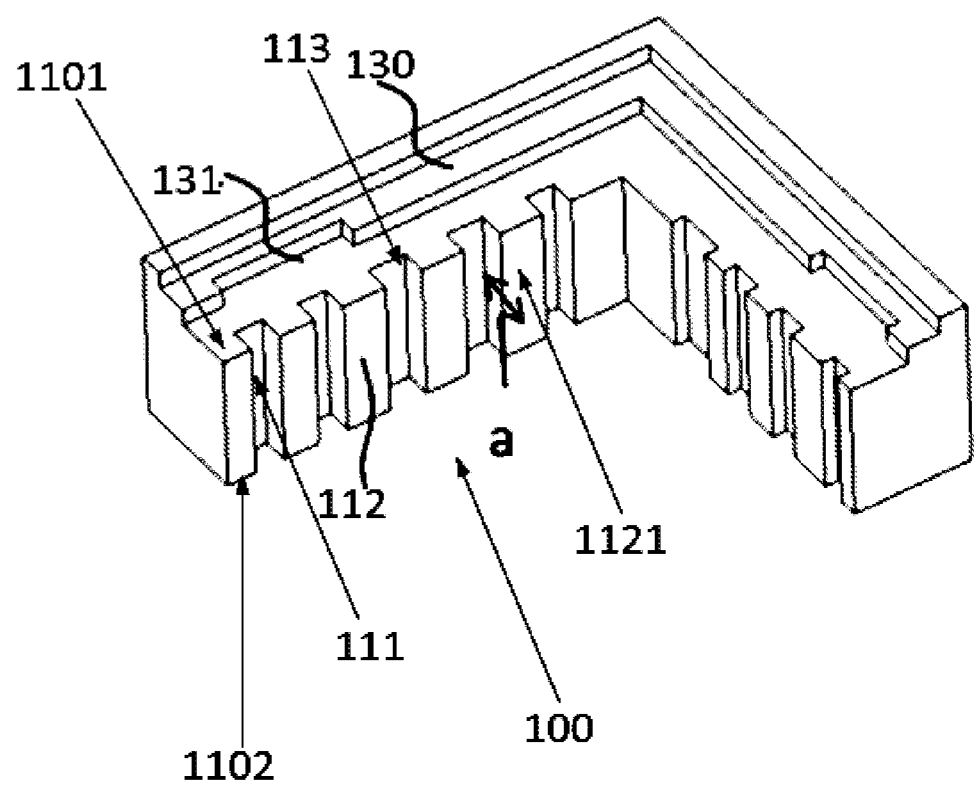
FIG. 6 is a perspective view of a positioning structure of some embodiments of the present disclosure.

Furthermore, some embodiments of the present disclosure also provides a positioning structure 100, as shown in FIG. 6, in some embodiments, a structural body of the positioning structure 100 is formed as an integrated structure. The structural body includes a surface provided with multiple protruding structures 112. A groove 113 with a quadrangular cross section is formed between two adjacent protruding structures 112, and an inner bottom surface of the groove 113 is formed as a bottom surface 111 of the structural body.

Furthermore, Surfaces of the multiple protruding structures 112 away from the bottom surface 111 are in a same plane, a surface of each protruding structure 112 away from the bottom surface 111 forming one contact positioning surface 1121, and the whole of contact positioning surfaces 1121 are formed as a first positioning surface for positioning an end surface of the light guide plate.

In some embodiments, each protruding structure 112 extends from a first surface 1101 of the first body 110 to a second surface 1102 of the first body 110 facing the first surface 1101, wherein the first surface 1101 and the second surface 1102 respectively extend to form two end surfaces of a positioning surface of each protruding structure 112. In some embodiments, the second surface 1102 is formed as a surface that conforms to the back plate, and the first surface 1101 is arranged in parallel with the second surface 1102. Based on the arrangement, the protruding structures 112 extend perpendicular to the back plate. a Structure and arrangement manner of the protruding structures 112 are the same as that in some embodiments shown in FIG. 1 described above. Therefore, a width of the groove 113 between each two adjacent protruding structures 112 and the contact positioning surface 1121 and a distance a between the contact positioning surface 1121 and the bottom surface 111 are arranged in a same manner as in the embodiments described in FIG. 1, which will be not repeated herein.

Referring to FIG. 6, in some embodiments, multiple step-shaped surfaces are disposed at an upper end of the first surface 1101 and parallel to the first surface 1101, and each step-shaped surface is formed as a second positioning surface 130 for supporting one optical film, and a groove 131 is arranged on each second positioning surface 130, and formed as a positioning and matching portion for positioning the optical film. Protrusions are disposed on the optical film correspondingly matching the groove 131, for positioning mounting of the optical film on the second positioning surface 130.

Furthermore, according to FIG. 6, in some embodiments, the positioning structure includes two portions arranged at an angle, for positioning an end surface of the light guide plate and an end surface of the optical film adjacent to the end surface of the light guide plate, respectively.

When a backlight source is assembled by using the arrangement described above, the positioning structure 100 is arranged on a back plate, and the first positioning surface including multiple contact positioning surfaces 1121 is perpendicular to the back plate, and the second positioning surface 130 is parallel to the back plate, and the light guide plate is arranged on the back plate, and an end surface of the light guide plate is in close contact with the first positioning surface, thereby the positioning of the light guide plate is completed; the optical film is arranged parallel to the light guide plate and is placed on the second positioning surface 130, and a positioning and matching portion on the optical film is cooperative with a positioning and matching portion on the second positioning surface 130, thereby the positioning and mounting of the optical film is completed.

In the positioning structure according some of the above-described embodiments of the present disclosure, a structure for forming the first positioning surface and a structure for forming the second positioning surface are not related to each other. When a positioning structure the backlight source is designed in practice, in a case that a structure for forming the first positioning surface adopts one of the above structural forms, a structure for forming the second positioning surface is not limited to the structure respectively defined in some embodiments described above.

Another aspect of some embodiments of the present disclosure further provides a backlight source. The backlight source may include a light guide plate and an optical film. The backlight source may further include a positioning structure of any of the above arrangements. An end surface of the light guide plate is in contact with a first positioning surface of the positioning structure, and an end surface of the optical film is matched with a second positioning surface of the positioning surface.

It can be understood that the backlight source may further include a border, a back plate, a light source and the like. Taking the embodiment described above as an example, as shown in FIG. 3, the optical film is disposed in a space formed by the border 3, and a member between the back plate 400 and the border 3 is formed as a backlight source 2.

The backlight source 2 of the above arrangement is combined with the display panel 1 to form a display module.

Some embodiments of the present disclosure also provide a display module and a display device, each of which including a backlight source with above arrangement. Based on the above detailed description of the positioning structure, those skilled in the art should be able to obtain a specific structure of the backlight source using the positioning structure of the present disclosure, which will not be described in detail herein.

For the positioning structure, the backlight source, the display module, and the display device of some embodiments of the present disclosure, a first positioning surface for positioning the light guide plate is designed as multiple contact positioning surfaces spaced from each other, and intervals are formed between the each two adjacent contact positioning surfaces used for positioning the light guide plate, thereby increasing the extendable range of the light guide plate when the backlight source is in operation, and supplementing a difference in positioning redundancy between the light guide plate and the optical film due to different thermal expansion coefficients of the light guide plate and the optical film, thereby enabling the positioning structure for the light guide plate and the optical film to be formed into one structure, simplifying the structure of the whole backlight source, and reducing a complexity of a structure of a backlight source caused by different positioning structures for the light guide plate and the optical film in a related art.

The above embodiments are merely optional embodiments of the present disclosure. It should be noted that numerous improvements and modifications may be made by those skilled in the art without departing from the principle of the present disclosure, and these improvements and modifications shall also fall within the scope of the present disclosure.

What is claimed is:

1. A positioning structure, applied to a backlight source comprising a light guide plate and an optical film, the positioning structure comprising a structural body, wherein the structural body comprises:

a plurality of protruding structures spaced from each other, an end portion of each of the protruding structures adjacent to the light guide plate forming a contact positioning surface, and at least two contact positioning surfaces located in a same plane forming a first positioning surface for positioning an end surface of the light guide plate;

wherein the structural body is provided with a second positioning surface for positioning an end surface of the optical film of the backlight source, and the second positioning surface and the first positioning surface are located at different planes, wherein the structural body further comprises a bottom surface, the contact positioning surfaces of the plurality of protruding structures are formed as a surface which is arranged on the bottom surface and closest to the light guide plate on the plurality of protruding structures protruding from the bottom surface, the plurality of protruding structures are formed as cylinders arranged on the bottom surface, and the cylinders extend in a direction perpendicular to the bottom surface, and the plurality of protruding structures formed as cylinders is arranged in rows on the bottom surface.

2. The positioning structure according to claim 1, wherein each of the plurality of protruding structures extends from a first surface of the structural body to a second surface of the structural body facing the first surface, wherein the first surface and the second surface respectively extend to form two end surface of each of the plurality of protruding structures.

3. The positioning structure according to claim 2, wherein a groove with a quadrangular cross section is formed between two adjacent protruding structures, and an inner bottom surface of the groove is formed as a bottom surface of the structural body.

4. The positioning structure according to claim 2, wherein the plurality of protruding structure extend in a direction parallel with or perpendicular to a first direction, wherein the first direction is a longitudinal direction of an end surface of the light guide plate positioned by the first positioning surface.

5. The positioning structure according to claim 1, wherein the number of the second positioning surfaces is at least two, the second positioning surfaces are respectively located in different planes, and the at least two second positioning surfaces are each perpendicular to the first positioning surface.

6. The positioning structure according to claim 5, wherein at least two second positioning surfaces are formed in a stepped shape.

7. The positioning structure according to claim 6, wherein the structural body comprises a fourth surface perpendicular to the first positioning surface, and the fourth surface is provided with grooves of different sizes, the grooves form at least two step-shaped surfaces, each of the at least two step-shaped surfaces is formed as one of the second positioning surfaces.

8. A backlight source, comprising a light guide plate and an optical film, wherein the backlight further comprises the positioning structure according to claim 1, wherein an end surface of the light guide plate is connected oppositely to the first positioning surface, and an end surface of the optical film is connected to the second positioning surface.

9. A display module, comprising the backlight source according to claim 8.

10. A display device, comprising the display module according to claim 9.

11. The positioning structure according to claim 1, wherein a distance between the contact positioning surface and the bottom surface is less than or equal to a thermal expansion amount of the light guide plate when the backlight source is in operation and greater than a preset value, wherein the preset value is a difference value between a thermal expansion amount of the light guide plate and a thermal expansion amount of the optical film when the backlight source is in operation.

12. The positioning structure according to claim 1, wherein the bottom surface is parallel to each of the contact positioning surfaces.

13. The positioning structure according to claim 1, wherein in a second direction, an interval width between two adjacent protruding structures is less than twice a width of a larger contact positioning surface of the two adjacent contact positioning surfaces, and is greater than half of the width of the larger contact positioning surface, the second direction is a direction determined on the plane of the first positioning surface along which two adjacent contact positioning surfaces has a minimum distance therebetween.

14. The positioning structure according to claim 1, wherein a second body is vertically disposed on a third surface of the first body, the contact positioning surface is arranged on the first body, the second positioning surface is arranged on the second body, and the contact positioning surface is perpendicular to the third surface and the second positioning surface.

* * * * *